(12) United States Patent
Karabinis

(10) Patent No.: US 9,726,550 B2
(45) Date of Patent: Aug. 8, 2017

(54) DIGITAL THERMOMETER OF ANTIMICROBIAL COPPER

(71) Applicant: Apostolos Karabinis, Peania (GR)

(72) Inventor: Apostolos Karabinis, Peania (GR)

(73) Assignee: Mekylon S.A., Peania (GR)

( * ) Notice: Subject to any disclaimer, the term of this patent is extended or adjusted under 35 U.S.C. 154(b) by 430 days.

(21) Appl. No.: 13/261,850

(22) PCT Filed: Oct. 17, 2012

(86) PCT No.: PCT/GR2012/000047
§ 371 (c)(1),
(2) Date: Apr. 24, 2014

(87) PCT Pub. No.: WO2013/064847
PCT Pub. Date: May 10, 2013

(65) Prior Publication Data
US 2014/0376596 A1    Dec. 25, 2014

(30) Foreign Application Priority Data

Oct. 31, 2011    (GR) ............................. 20110100612

(51) Int. Cl.
*G01K 1/00*      (2006.01)
*G01K 1/08*      (2006.01)
*G01K 13/00*     (2006.01)

(52) U.S. Cl.
CPC ........... *G01K 1/083* (2013.01); *G01K 13/002* (2013.01)

(58) Field of Classification Search
CPC ............................. G01K 1/083; G01K 13/002
See application file for complete search history.

(56) References Cited

U.S. PATENT DOCUMENTS

| 4,991,976 A | * | 2/1991 | Byles | ....................... G01K 1/18 |
| | | | | 136/230 |
| 6,109,784 A | * | 8/2000 | Weiss | ....................... G01K 7/42 |
| | | | | 374/164 |

(Continued)

FOREIGN PATENT DOCUMENTS

| EP | 2773932 B1 | 11/2016 |
| GR | 1007847 B | 3/2013 |

(Continued)

OTHER PUBLICATIONS

Efstathiou, P. et al., A digital antimicrobial thermometer for axillary use: A new device to measure body temperature that contributes to the reduction of cross-infections, pp. 1-17, National and Kapodistrian University of Athens.

(Continued)

*Primary Examiner* — Lisa Caputo
*Assistant Examiner* — Janice M Soto
(74) *Attorney, Agent, or Firm* — C. John Brannon; Brannon Sowers & Cracraft PC

(57) ABSTRACT

Digital Thermometer of antimicrobial copper, meant for medical use, consisting externally of the body (1), the battery cover that is the removable part through which the battery is inserted into the thermometer (2), the power button i.e. ON-OFF button (3), the display (4) and the tip, that is the sensor for measuring temperature (5) and is characterized by the fact that the outer surface of these components except of the display, is made of antimicrobial copper, or bears antimicrobial copper.

Due to the antimicrobial-bacteriostatic properties of copper and its alloys with antimicrobial properties, it is achieved naturally—without any further interference, i.e. without disinfectants use—the neutralization of pathogenic microbes (Continued)

that infest the thermometer body, therefore it is achieved limitation of their further dispersion.

2 Claims, 1 Drawing Sheet

(56) References Cited

U.S. PATENT DOCUMENTS

| | | | |
|---|---|---|---|
| 6,146,015 A | 11/2000 | Weiss | |
| 2010/0136325 A1* | 6/2010 | Reddy | A01N 25/34 |
| | | | 428/329 |
| 2010/0328090 A1* | 12/2010 | Hiramatsu | G01K 13/002 |
| | | | 340/687 |

FOREIGN PATENT DOCUMENTS

| | | | |
|---|---|---|---|
| NZ | 628389 A | 11/2015 | |
| RU | 2604106 C2 | 11/2015 | |
| SG | 11201403721 A | 9/2014 | |
| UA | 111400 C2 | 4/2016 | |
| WO | 2013064847 A2 | 5/2013 | |

OTHER PUBLICATIONS

Efstathiou, P. et al., Copper-coated thermometer for the prevention of cross-infections: preliminary results, American Journal of Emergency Medicine, 2016, pp. 1-4, Elsevier, www.elsevier.com.

Efstathiou, P. et al., Digital antimicrobial thermometer for axillary usage: A new device for measuring the temperature of the body for the reduction of cross-infections, National Health Operations Center, pp. 1, Athens, Greece.

* cited by examiner

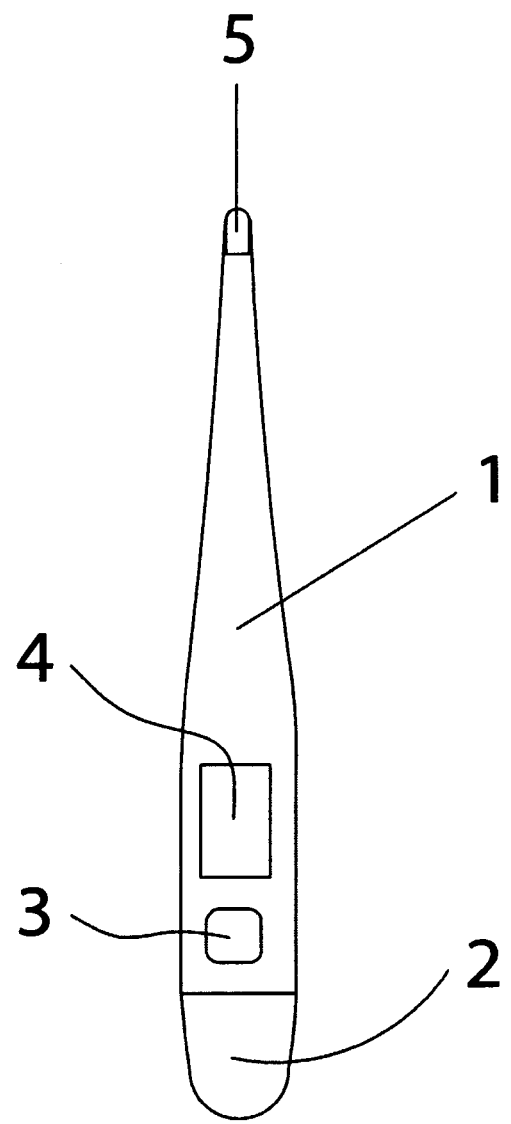

DIGITAL THERMOMETER OF ANTIMICROBIAL COPPER

CROSS REFERENCE TO RELATED APPLICATIONS

The present application is a U.S. National Phase of International PCT Application No. PCT/GR2012/000047 filed on Oct. 17, 2012, the contents of which are hereby incorporated by reference in their entirety.

TECHNICAL FIELD

The invention relates to a digital thermometer for medical use, in whole or in part external surface of antimicrobial copper.

BACKGROUND ART

In medical practice today, to measure human body temperature, we use digital thermometers that their external part is mainly made of plastic, with metal tip mostly made of various metal alloys. The usual digital thermometers have a variety of sizes, designs and types, depending on the indicated part of the body to which they come into is contact (armpit, ear, and forehead). In the market are also found thermometers measuring temperature with remote method (non contact, laser thermometer, etc.).

Generally, digital thermometers of all types, consist of the body, the battery cover, that is the removable part through which the thermometer battery is replaced, the power button, that is the key ON-OFF, the display and the tip, which forms the sensor for measuring temperature.

The thermometer, mostly when used in hospitals or other health facilities (e.g. elderly homes) is a carrier of microbes, as firstly it comes into direct contact with the human body and with the body cavities (oral cavity, rectum), secondly it is used by a large number of patients, without compliance with the disinfection rules. 80% of contagious diseases are spread by touch. The pathogens remain viable and infectious, on the surfaces for many hours, days, even months, forming a pool of infections transmitted by touch. Pathogens though, can not survive on the copper surface. Thus, the copper can break the chain of infections transmission and acts complementary to the regular cleaning, for hygiene improvement.

It is now scientifically proven that copper and some of its alloys, have antibacterial and bacteriostatic abilities, meaning, they have the capacity to eliminate or inactivate microbes such as bacteria, fungi (including mold) and viruses, including among others, the resistant *Staphylococcus aureus, Staphylococcus aureus* (MRSA), the clostridia *Clostridium difficile*, influenza A (H1N1) and the bacterium *Escherichia coli* O157: H7.

The pure copper and its alloys that have antimicrobial properties, consist the so-called antimicrobial copper (Antibacterial copper). The antimicrobial copper is safe, long lasting and destroys an extremely high amount of microbes (>99.9%) in a colony, presenting a disruption of their cell's function in several ways. The antimicrobial copper efficacy is extremely rapid (usually within a few minutes to several hours). The rapid death of bacteria will not allow their resistance in growing, since the cells do not have the opportunity to develop a defense mechanism. Less than 0.01% of germs survive on a copper surface after 24 hours exposure.

The antimicrobial copper products maintain antimicrobial properties in long term. Even if these surfaces are carved, the antimicrobial effectiveness continues to exist—not being degraded like other types of processed surfaces. Thus, antimicrobial copper offers a dynamic of significant reduction to the number of inner-hospital infections, both in laboratory and clinical environment, when used on touch surfaces. The use of antimicrobial copper already takes place in hospital and other health facilities abroad, as a touch pad on doorknobs, doors, patient's tables and patient's orostates.

The American Environmental Protection Agency (USA Environmental Protection Agency), has approved the copper registration, in a list that includes all the elements with antimicrobial properties, having officially registered 275 copper alloys as antimicrobial, with positive qualities for public health. To ensure and guarantee the quality of antimicrobial copper products, and their marking as antimicrobial copper products, it is provided an international certification with the mark CU+ (Antimicrobial Copper) by the International Copper Association (International Copper Association (ICA). The International Copper Association determines which alloys are certified as antimicrobials, also the use conditions of antimicrobial copper, in the production (www.copper.org.gr, www.antimicrobialcopper.com). For further details on the properties of antimicrobial copper (antimicrobial copper), its scientific evidence and practical significance, we refer to the International Copper Association (International Copper Association (ICA), the International Copper Association Study (International Copper Study Group (ICSG), the European Copper Institute and finally the Greek Institute Copper Development (E.I.A.CH, www.copper.org.gr).

DISCLOSURE OF INVENTION

The digital thermometer of antimicrobial copper, according to the present invention is a medical digital thermometer, of every type, design or size, consisting externally of the main body, the battery cover, that is the removable part through which we replace the thermometer battery, the power button that is the key ON-OFF, the display and the tip, which comes into contact with a designated part of the human body and forms the sensor for measuring temperature. The specific feature, however, of the digital thermometer made of antimicrobial copper is that, the outer surface of its components, meaning the outer casing of the thermometer, except of the display, is made of antimicrobial copper or bears antimicrobial copper, in its whole or in some parts of it.

The digital thermometer of antimicrobial copper, according to the present invention, is not prevented to be constructed on its outer surface, by antimicrobial copper, only in some or part of the outer parts described above, selectively and not in its entirety, without significantly decreasing its effectiveness. That means, the digital thermometer of antimicrobial copper retains its effectiveness when made from antimicrobial copper parts as: tip-temperature sensor and/or power button given that the largest number of pathogenic microbes of a thermometer, is concentrated at these points. The advantage of this invention is the achievement of the maximum natural—without any further act that is without use of disinfectants—the neutralization of pathogenic microbes that infest on the thermometer body, therefore achievement and limitation of further dispersion. Thus, the invention greatly contributes to the fight against infections transmitted by touch of the thermometer, particularly when using in hospitals and other health facilities.

BRIEF DESCRIPTION OF DRAWING

The attached FIG. 1 shows the front side of an armpit thermometer. The thermometer consists of the body (1), the battery cover, i.e. the removable part through which the battery is inserted into the thermometer (2), the power button i.e. ON-OFF (3), the screen indications (4) and the tip i.e. the part that comes into contact with a designated part of the human body, which is the sensor for measuring temperature (5).

MODES FOR CARRYING OUT THE INVENTION

One way of producing a digital thermometer of antimicrobial copper, is, with the construction of the entire external surface of it, or part/s thereof, except of the display (4), that is the body (1) and/or battery cover (2) and/or the Power Button (3) and/or the tip-measuring temperature sensor (5) of solid antimicrobial copper, as the only material of all or part/s of the outer casing of the thermometer.

Another way of producing digital thermometer of antimicrobial copper, is, with an outer layer of antimicrobial copper over the entire outer surface of it, or part/s thereof, except of the display (4), that is the body (1) and/or battery cover (2) and/or the Power Button (3) and/or the tip-measuring temperature sensor (5), with all acceptable methods of coating, for which it is provided the international quality certification, a product made of antimicrobial copper.

INDUSTRIAL APPLICABILITY

In FIG. 1 displayed, it has been used as an example, the armpit thermometer. Nevertheless, the use of antimicrobial copper can be proportionate, in accordance with the above, also into other types of medical thermometers, as the ear thermometer, the forehead thermometer and the non-contact thermometer, since all of them are consisted externally of the same parts, having the same function and use.

The invention claimed is:

1. A digital thermometer of antimicrobial copper, which is a medical digital thermometer of any type, design, or size, comprising:
   a body,
   a battery cover that is a removable part through which a battery is inserted into the thermometer,
   a power button comprising an ON-OFF key,
   a display, and
   a tip that is a sensor for measuring temperature, and
   wherein outer surfaces of the tip, the body, the battery cover, and the power button are made of solid antimicrobial copper.

2. The digital thermometer of claim 1, wherein the antimicrobial copper is selected from the group comprising pure copper and an antimicrobial copper alloy; and wherein the use of antimicrobial copper disrupts at least one cell function of pathogenic microbes on a surface of the antimicrobial copper so that pathogenic microbes do not survive on the antimicrobial copper surface.

\* \* \* \* \*